US012611008B2

(12) United States Patent
Johnson

(10) Patent No.: US 12,611,008 B2
(45) Date of Patent: *Apr. 28, 2026

(54) GARMENT, ESPECIALLY SPORTS GARMENT

(71) Applicant: PUMA SE, Herzogenaurach (DE)

(72) Inventor: Charles Johnson, Nuremberg (DE)

(73) Assignee: PUMA SE, Herzogenaurach (DE)

( * ) Notice: Subject to any disclaimer, the term of this patent is extended or adjusted under 35 U.S.C. 154(b) by 891 days.

This patent is subject to a terminal disclaimer.

(21) Appl. No.: 17/284,104

(22) PCT Filed: Oct. 13, 2018

(86) PCT No.: PCT/EP2018/077968

§ 371 (c)(1),
(2) Date: Apr. 9, 2021

(87) PCT Pub. No.: WO2020/074109

PCT Pub. Date: Apr. 16, 2020

(65) Prior Publication Data

US 2021/0352996 A1    Nov. 18, 2021

(51) Int. Cl.
| | |
|---|---|
| *A43B 23/02* | (2006.01) |
| *A41D 31/30* | (2019.01) |
| *A43B 7/00* | (2006.01) |
| *B32B 3/28* | (2006.01) |
| *B32B 27/08* | (2006.01) |
| *B32B 27/12* | (2006.01) |
| *D06M 16/00* | (2006.01) |

(52) U.S. Cl.
CPC .......... *A43B 23/0235* (2013.01); *A41D 31/30* (2019.02); *A43B 7/00* (2013.01); *A43B 23/0225* (2013.01); *B32B 3/28* (2013.01); *B32B 27/08* (2013.01); *B32B 27/12* (2013.01); *D06M 16/00* (2013.01); *B32B 2255/26* (2013.01); *B32B 2307/716* (2013.01); *C08L 2201/06* (2013.01)

(58) Field of Classification Search
CPC ... A43B 23/0235; A43B 7/00; A43B 23/0225; A41D 31/30; B32B 3/28; B32B 27/08; B32B 27/12; B32B 2255/26; B32B 2307/716; D06M 16/00; C08L 2201/06
See application file for complete search history.

(56) References Cited

U.S. PATENT DOCUMENTS

| | | | |
|---|---|---|---|
| 2,240,599 | A | 5/1941 | Amberg |
| 4,063,371 | A | 12/1977 | Batra |
| 4,092,221 | A | 5/1978 | Schlichting, Jr. |
| 5,350,783 | A | 9/1994 | Reich |
| 6,376,213 | B1 | 4/2002 | Oda et al. |
| 8,741,597 | B2 | 6/2014 | Orenga et al. |
| 8,745,892 | B2 | 6/2014 | Polegato Moretti |
| 9,131,738 | B2 * | 9/2015 | Ly ..................... A41D 31/065 |

| | | | |
|---|---|---|---|
| 11,793,274 | B2 * | 10/2023 | Johnson ............. A43B 23/0205 |
| 2003/0199095 | A1 | 10/2003 | Yuyama et al. |
| 2005/0031733 | A1 | 2/2005 | Domingues et al. |
| 2005/0204449 | A1 | 9/2005 | Baron et al. |
| 2006/0257908 | A1 | 11/2006 | Rui et al. |
| 2008/0053556 | A1 | 3/2008 | Lin |
| 2013/0042380 | A1 * | 2/2013 | Goodman ............ A41D 31/125 |
| | | | 2/69 |
| 2013/0130399 | A1 | 5/2013 | Mills et al. |
| 2013/0269592 | A1 | 10/2013 | Heacock et al. |
| 2014/0065311 | A1 | 3/2014 | Moseley et al. |
| 2015/0346513 | A1 | 12/2015 | Heacock |
| 2015/0370320 | A1 | 12/2015 | Connor |
| 2016/0135543 | A1 | 5/2016 | Anceresi et al. |
| 2017/0027482 | A1 | 2/2017 | Zilberstein et al. |
| 2017/0066583 | A1 | 3/2017 | Kimbrough |
| 2017/0082573 | A1 | 3/2017 | Vingerhoets et al. |
| 2017/0169692 | A1 | 6/2017 | Parra et al. |
| 2017/0322163 | A1 | 11/2017 | Heacock |
| 2018/0104017 | A1 | 4/2018 | Heacock |
| 2019/0145849 | A1 | 5/2019 | Jensen |
| 2019/0285577 | A1 | 9/2019 | Swager et al. |
| 2020/0113287 | A1 | 4/2020 | Johnson et al. |
| 2020/0156839 | A1 | 5/2020 | Abramov |

FOREIGN PATENT DOCUMENTS

| | | | | |
|---|---|---|---|---|
| EP | 3114951 | B1 * | 4/2021 | ........... A43B 1/0009 |
| JP | H0889284 | A | 4/1996 | |
| JP | H09187431 | A | 7/1997 | |

(Continued)

OTHER PUBLICATIONS

Chowdhury, P., Samanta, K. K., & Basak, S. (2014). Recent development in textile for sportswear application. International Journal of Engineering Research, 3(5), 1905-1910. (Year: 2014).*
Danso et al. 2018. New insights into the function and global distribution of polyethylene terephthalate PET-degrading bacteria and enzymes in marine and terrestrial metagenomes. Appl Environ Microbiol 84:e02773-17. https://doi.org/10.1128/AEM.02773-17. (Year: 2018).*
Peng, YH., Shih, Yh., Lai, YC. et al. Degradation of polyurethane by bacterium isolated from soil and assessment of polyurethanolytic activity of a Pseudomonas putida strain. Environ Sci Pollut Res 21, 9529-9537 (2014). https://doi.org/10.1007/s11356-014-2647-8 (Year: 2014).*

(Continued)

*Primary Examiner* — Thomas J. Visone
*Assistant Examiner* — Georgiana C Reglas
(74) *Attorney, Agent, or Firm* — Quarles & Brady LLP

(57) ABSTRACT

The present disclosure relates to a garment, especially to a sports garment, which includes a region which is in contact with a wearer during intended use. The region includes at least one material layer. To allow an improved ventilation at those locations where the same is really needed the present disclosure proposes that the region has at least one receiving space in which microorganisms are placed, and the microorganisms are selected to corrode at least a portion of the material layer under certain conditions.

20 Claims, 3 Drawing Sheets

(56) References Cited

FOREIGN PATENT DOCUMENTS

| | | | | |
|---|---|---|---|---|
| JP | 2003007285 A | 1/2003 | | |
| JP | 2006214857 A | 8/2006 | | |
| JP | 2015532675 A | 11/2015 | | |
| JP | 2017502705 A | 1/2017 | | |
| JP | 2017533764 A | 11/2017 | | |
| JP | 2018534990 A | 11/2018 | | |
| WO | 2010006442 A1 | 1/2010 | | |
| WO | WO-2017067566 A1 * | 4/2017 | ........... | A43B 13/141 |
| WO | 2017162825 A1 | 9/2017 | | |
| WO | 2020074109 A1 | 4/2020 | | |

OTHER PUBLICATIONS

Hitchens, Arthur Parker, and Morris C. Leikind. "The introduction of agar-agar into bacteriology." Journal of bacteriology 37.5 (1939): 485-493. (Year: 1939).*

Fernandes, Isabel Patrícia, et al. "Biobased additives as biodegradability enhancers with application in TPU-based footwear components." Journal of Renewable Materials 4.1 (2016): 47. (Year: 2016).*

Zhang, Q.C. et al. (2015). Bio-Inspired Engineering of Honeycomb Structure—Using Nature to Inspire Human Innovation. Progress in Materials Science. 74. 332-400. 10.1016/j.pmatsci.2015.05.001. (Year: 2015).*

BioLogic (vimeo video retrieved from https://vimeo.com/ 142208383 Apr. 8, 2024. Posted Oct. 12, 2015) (Year: 2015).*

Peterson, B. "The First Truly Breathable Fabric Contains Living Bacteria" article. Mar. 2016. Retrieved from https://www. smithsonianmag.com/innovation/first-truly-breathable-fabric-contains-living-bacteria-180958106/#:~:text=But%20a%20garment%20that%27s%20actually,to%20the%20person%20wearing%20it (Year: 2016).*

MIT Media Lab Tangible Media Group. "BioLogic"; available online Oct. 18, 2017. Retrieved online Mar. 17, 2025 from: https:// tangible.media.mit.edu/project/biologic/ (Year: 2017).*

Suganthi et al.(Thermal Comfort properties of a Bi-layer Knitted Fabric: Structure for Volleyball Sportswear. Fibres & Textiles in Eastern Europe 2017; 25, 1(121):75-80. (Year: 2017).*

Office action from Japanese Application No. 2021-559431 mailed May 22, 2023 (English translation), 6 pages.

Gigi et al., "Effect of growth temperature on several exported enzyme activities in the psychrotrophic bacterium Pseudomonas fluorescens", Journal of Bacteriology, 1991, vol. 173, No. 12, pp. 3814-3820 (Year: 1991) (7 pages).

Tanasupawat et al., "Indeonella salaiensis sp. Nov., isolated from microbial consortium that degrades poly(ethylene terephthalate)", International Journal of Systematic and Evolutionary Microbiology, 2016, vol. 66, issue 8, pp. 281302828 (Year 2016) (16 pages).

Anna Winston: "Puma and MIT Design Lab envision a future of self-adapting, per-media-lab-puma-future-s", May 24, 2018 (May 24, 2018), XP055594193, Retrieved from the Internet: URL:https:// www.dezeen.com/2018/05/24/mit-media-ab-pum-future-sportswear-design/ [retrieved on Jun. 5, 2019] p. 1, line 10-line 13.

Yoshida et al.: "A bacterium that degrades and assimilates poly-(ethylene terephthalate)", Science, vol. 351, No. 6278, Mar. 11, 2016 (Mar. 11, 2016), pp. 1196-1199, XP002771140, D0I: 10.1126/ SCIENCE. AAD6359, the whole document.

Aamer Ali Shah et al: "Degradation of polyurethane by novel bacterial consortium isolated from soil", Annals of Microbiology, vol. 58, No. 3, Sep. 2008 (Sep. 2008), pp. 381-386, XP055594224, IT ISSN: 1590-4261, D01: 10.1007/BF03175532, the whole document.

International Search Report of International Application No. PCT/ EP2018/077968, mailed Jun. 13, 2019, 4 pages.

Written Opinion of International Application No. PCT/EP2018/ 077968, mailed Jun. 13, 2019, 7 pages.

International Preliminary Report on Patentability (Form IPEA/409) of International Application No. PCT/EP2018/077968, mailed Feb. 22, 2021, 19 pages.

Hedge et al. "A comparative review of footwear-based wearable systems", Electronics, 2016, vol. 5, issue 3, 48 (Year: 2016).

Catenacci, T., "These new shoes designed by Puma and MIT Lab can tell how you're feeling", CNBC news article, published Jun. 6, 2018, https://www.cnbc.com/2018/06/05/puma-mit-shoes-can-breathe. html (Year: 2018).

Low, JH et al. "A pressure-redistributing insole using solft sensors and actuators", 2015 IEEE International Conference on Robotics and Automation (ICRA), 2015, pp. 2926-2930. (Year: 2015).

International Search Report and Written Opinion of the International Searching Authority from corresponding PCT Application No. PCT/IB2020/053031, dated Aug. 28, 2020 (11 pages).

Anonymous: "Puma Biodesign: Breathing Shoes", , Apr. 17, 2018 (Apr. 17, 2018), Retrieved from the Internet: URL: https://vimeo. com/265128805 [retrieved on Jun. 15, 2020].

Shah Aamer Ali et al: "Microbial degradation of aliphatic and aliphatic-aromatic co-polyesters", Applied Microbiology and Biotechnology, Springer Berlin Heidelberg, Berlin/Heidelber vol. 98, No. 8, Feb. 13, 2014 (Feb. 13, 2014), pp. 3437-3447, X P035328980, ISSN: 0175-7598, DOI: 10.1007/S00253-014-5558-1 [retrieved on Feb. 13, 2014].

International Search Report and Written Opinion issued in corresponding International Application No. PCT/IB2020/053028, dated Jun. 29, 2020, 15 pages.

Nigam, P. S. (Aug. 23, 2013). Microbial enzymes with special characteristics for biotechnological applications. Biomolecules. Retrieved Feb. 1, 2022, from https://www.ncbi.nlm.nih.gov/pmc/articles/ PMC4030947/ (Year: 2013).

Jerry, D. C. T., Mohammed, T., & Mohammed, A. (2017). Yeast-generated CO2: A convenient source of carbon dioxide for Mosquito trapping using the BG-sentinel® traps. Asian Pacific Journal of Tropical Biomedicine. Retrieved Feb. 1, 2022, from https ://www.sciencedirect.com/science/article/pii/S2 (Year: 2017).

* cited by examiner

GARMENT, ESPECIALLY SPORTS GARMENT

This application is a U.S. National Stage application, filed pursuant to 35 U.S.C. § 371, of international application no. PCT/EP2018/077968, filed on Oct. 13, 2018, the contents of which is incorporated herein by reference in its entirety.

The invention relates to a garment, especially to a sports garment, which comprises a region which is in contact with a wearer during intended use, wherein the region comprises at least one material layer.

During use the proper ventilation or aeration of a piece of garment, e. g. of a shoe, is specifically of importance when sporting activities are carried out. It is known to provide the piece of garment with respective openings or apertures to allow air to flow through the piece of garment during use.

Sometimes it is problematic to decide where openings or apertures should be located because this depends sometimes on the individual circumstances during the use of the piece of garment by the wearer.

Thus, it is an object of the invention to propose a piece of garment (i. e. a shoe or an apparel), especially a sports garment, which allows an improved ventilation at that locations where the same is really needed.

The solution of this object according to the invention is characterized in that that the mentioned region has a plurality of receiving spaces arranged at the inner side of the material layer and formed by a plurality of single chambers in which microorganisms are placed, wherein the plurality of receiving spaces is arranged along the extension of the material layer, wherein the single chambers are separated from another by a wall structure, wherein the wall structure is closed by a cover which is in contact with the wearer during intended use, wherein in addition to the microorganisms a gelatinous media is arranged in the receiving space, wherein the microorganisms are selected to corrode at least a portion of the material layer when heat and/or sweat is applied by the wearer during the intended use of the garment.

A plurality of receiving spaces can be arranged along the extension of the material layer, i. e. along the surface of the material layer. Said receiving spaces can form enclosed cavities in which the microorganisms are located. Preferably, a plurality of receiving spaces is formed as a substantially uniform pattern along the surface of the material layer. That pattern can have for example a rectangular, a round or a honeycomb shape.

Specifically preferred are microorganisms which are bacteria of the kind *ideonella sakaiensis*, especially of the kind *ideonella sakaiensis* 201-F6. Other preferred microorganisms are bacteria of the kind actinobacteria, of the kind proteobacteria, of the kind bacteroidetes and of the kind *pseudomonas putida*.

Those types of bacteria are known as such. Explicit reference is made to the following publications:

Dominik Danso et al. "New insights into the function and global distribution of polyethylene terephthalate (PET) degrading bacteria and enzymes in marine and terrestrial metagenomes", Department of Microbiology and Biotechnology, University of Hamburg.

"Plastik fressende Bakterien" in Spektrum der Wissenschaft, May 2016, Science 351, pages 1196-1199, 2016.

Susanne Donner "Die Plastikfresser kommen" in Technology Review, Aug. 17, 2016.

*Ideonella sakaiensis* is a bacterium from the genus *Ideonella* and family Comamonadaceae and is capable of biodegrade specifically polyethylene terephthalate.

Preferably, in addition to the microorganisms a gelatinous media, especially a gelatinous gel, is arranged in the receiving space.

For the material layer preferred materials are proposed to allow an efficient erosion by the mentioned bacteria. Thus, the material layer consists of or comprises preferably polyethylene terephthalate and/or polyurethane.

The garment is specifically preferred a sports shoe, a sports suit, a sports jacket, a sports trousers or a sports shirt. Other preferred applications are accessories which have contact to the body of the wearer during intended use; here specifically a backpack is taken in consideration which is correspondingly equipped and which has contact to the body of the wearer or user during intended use.

Thus, the garment, especially the shoe, is made at least partially of a biodegradable material. It is preferably patterned with microorganisms.

The mentioned region of the piece of garment can be produced (molded) with a cavity pattern. The cavities are then filled with bacteria and gelatinous media, for example a gelatinous gel.

The microorganisms in said cavities respond to the heat generated by the body of the wearer, specifically by the feet of the wearer during use of the shoe and proliferate by consuming the media in the cavities.

The garment, especially the shoe, can be produced in a solid color. As gelatinous media gets consumed by the microorganisms, the surface of the shoe, and more specifically of the material layer begins to erode and to create ventilation points which allow more air to flow through. Thus, the ventilation of the garment is selectively improved.

Over time, the garment, especially the shoe, begins to take a custom look based on the activity profile of the wearer.

A specifically preferred combination is the use of polyethylene terephthalate and bacteria of the kind *ideonella sakaiensis*, especially of the kind *ideonella sakaiensis* 201-F6.

Another specifically preferred combination is use of polyurethane and bacteria of the kind *pseudomonas putida*.

In the drawings an embodiment of the invention is shown.

Figure 1:
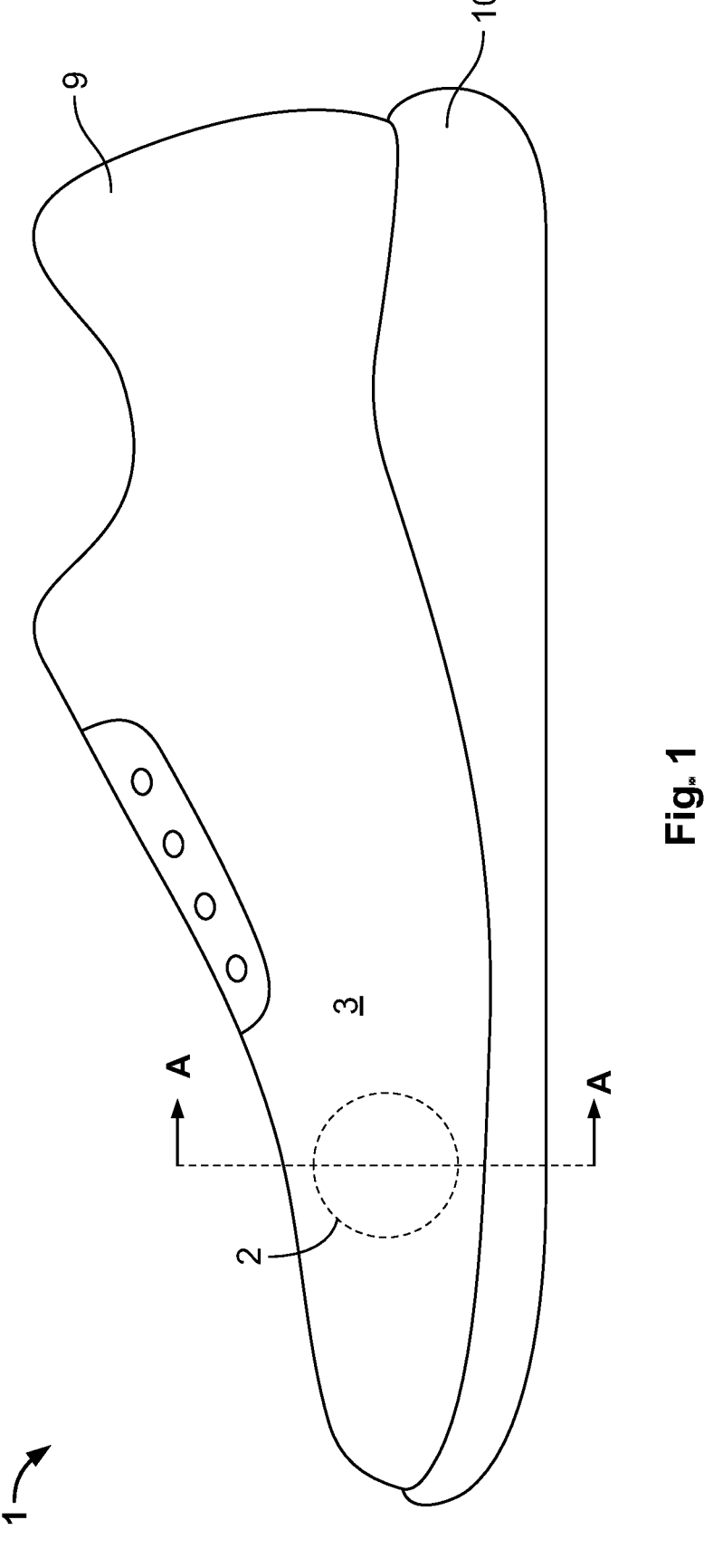
FIG. 1 shows a side view of a piece of garment, namely of a sports shoe.

In FIG. 1 a piece of garment being a sports shoe 1 is depicted. It has a shoe upper 9 and a sole 10 connected with the shoe upper 9. A certain region 2, which can be the whole shoe upper 9 and also the sole 10, is specifically provided to allow an improved aeration or ventilation of the shoe 1 after a certain time of use.

Figure 2:
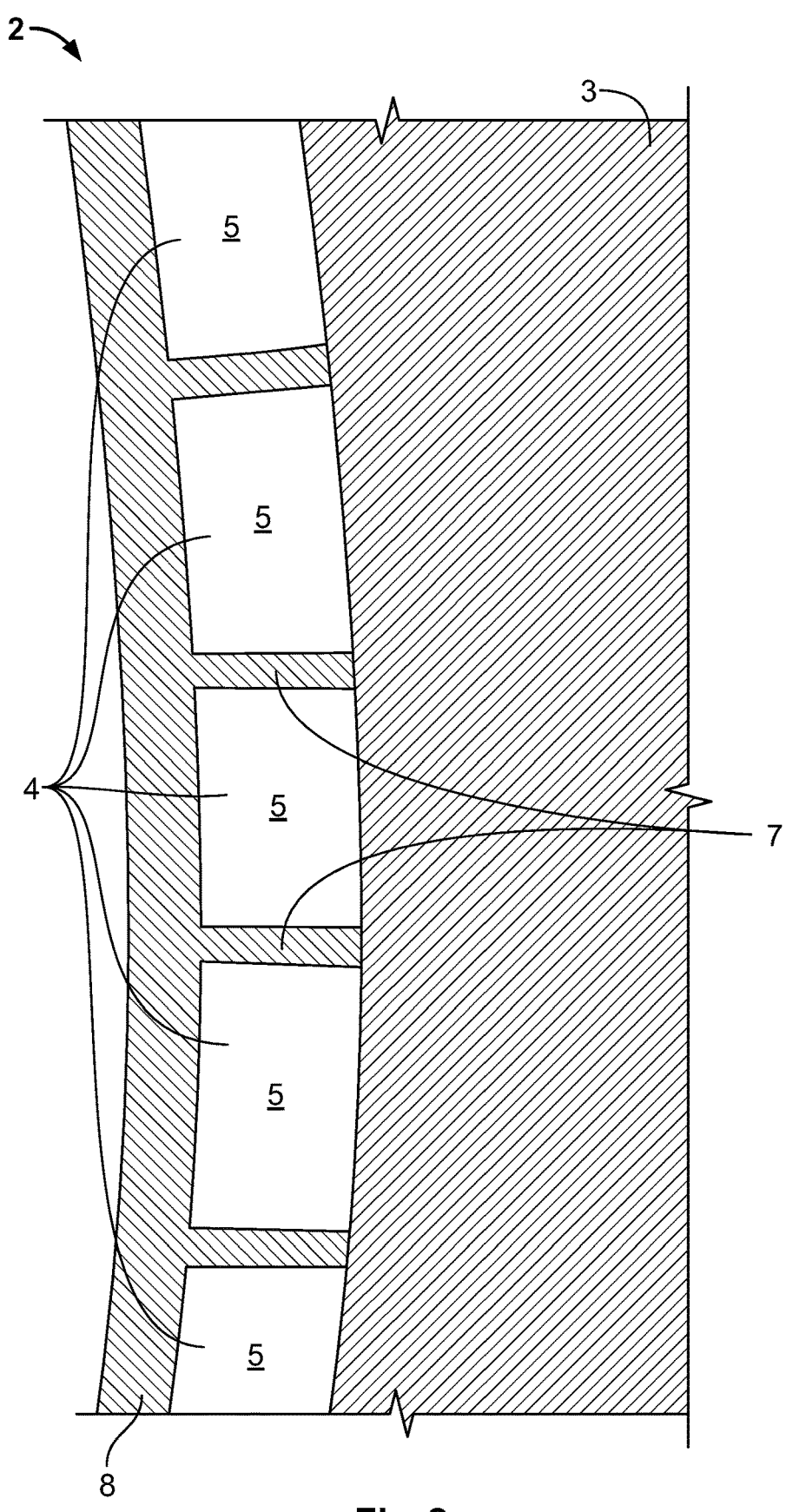
FIG. 2 shows the cross section A-A according to FIG. 1, wherein the shoe is not yet used.
Figure 3:
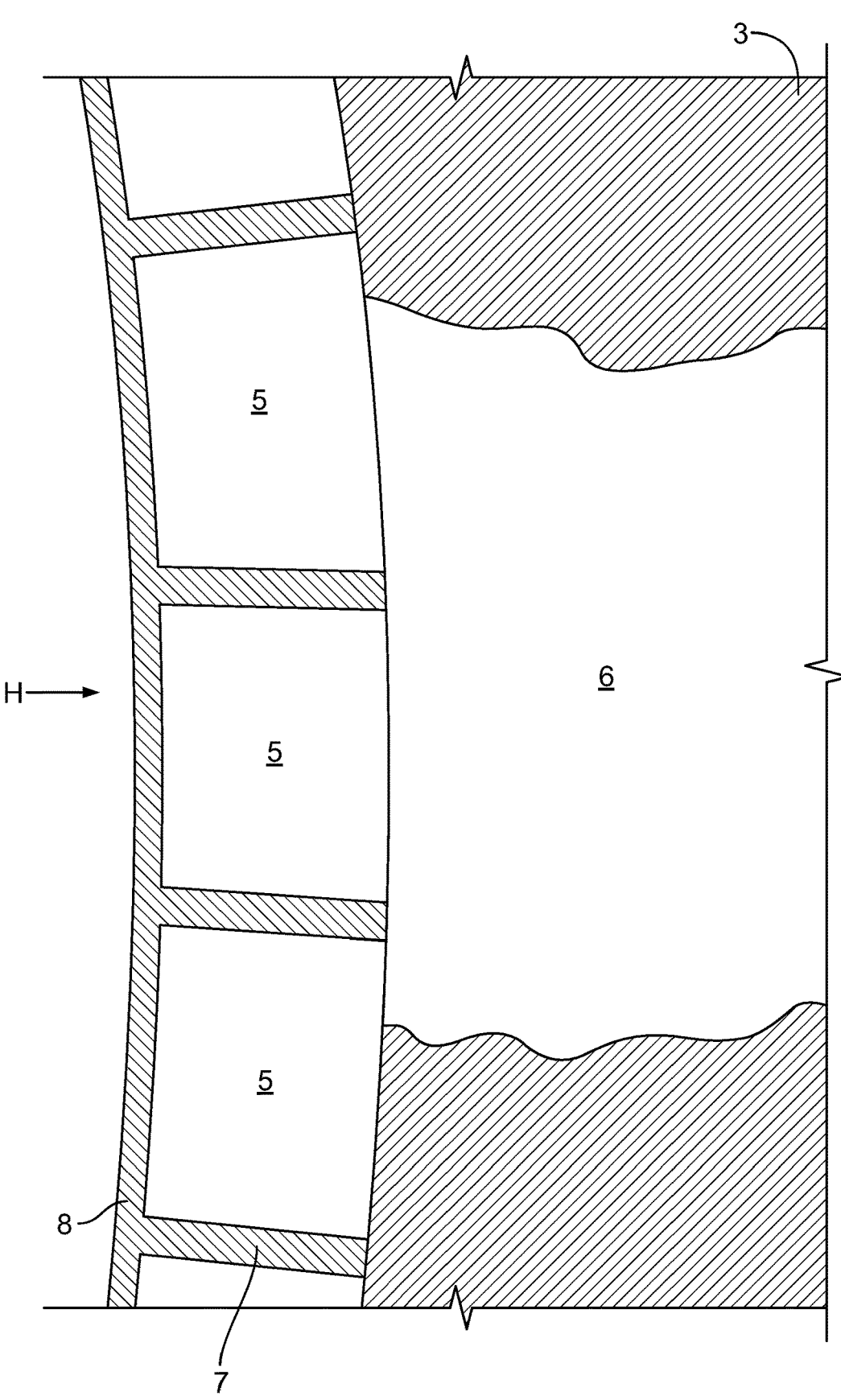
FIG. 3 shows the cross section A-A according to FIG. 1, wherein the shoe is now already used along a certain time.

The cross-sectional view through that region 2 is shown in FIGS. 2 and 3.

In FIG. 2 the outer material layer 3 of the shoe upper can be seen when the shoe is not yet used.

At the inner side of the material layer 3, i. e. at the side facing the foot of the wearer, a receiving space 4 is arranged. This receiving space 4 consists of a plurality of single chambers which are separated from another by a wall structure 7 which can have a rectangular, a round or a honeycomb (hexagonal) shape when viewed perpendicular to the surface of the material layer 3.

The wall structure 7 is closed by a thin cover 8. Thus, the receiving space 4 consists of a number of chambers in which microorganisms 5 are arranged. Additionally a gelatinous media is arranged in said chambers, i. e. a mixture of microorganisms and gelatinous media.

When heat (or sweat) H is applied during use of the shoe 1, as schematically depicted in FIG. 3, the microorganisms 5 in the gelatinous media become more or less active depending on the intensity of the heat (or sweat) application. Accordingly, the material of the layer 3 is eroded or biodegraded with a more or less intensity.

As depicted in FIG. 3 sections with an intensive application of heat and/or sweat erode the material layer 3 in such a manner that an aperture 6 is created. By the aperture 6 the ventilation of the shoe is locally enhanced.

Thus, the microorganism, especially the mentioned bacteria, erode the material layer partially so that (possibly quite small) apertures 6 are created along the time. Those apertures 6 allow an improved venting of the garment, namely just at those locations where it is mostly required to improve the convenience during wearing.

Depending on the individual creation of heat and sweat of a user of the piece of garment a specific arrangement of apertures is created which thus allow the creation of an optimized piece of garment for the individual user.

REFERENCE NUMERALS

1 Garment (shoe, apparel)
2 Region
3 Material layer
4 Receiving space
5 Microorganism
6 Aperture
7 Wall structure
8 Cover
9 Shoe upper
10 Sole
H Heat

The invention claimed is:

1. A garment, comprising a region which is in contact with a wearer during intended use, wherein the region comprises at least one material layer comprising polyethylene terephthalate and/or polyurethane,
   wherein the region has a plurality of receiving spaces arranged along an inner side of the material layer and formed by a plurality of single chambers in which microorganisms are placed,
   wherein the single chambers are separated from one another by a wall structure,
   wherein the wall structure is closed by a cover on a first side thereof, which is in contact with the wearer during intended use, the material layer being arranged on a second side of the wall structure, opposite the first side, the wall structure contacting the material layer,
   wherein, in addition to the microorganisms, a gelatinous media is arranged in the plurality of receiving spaces,
   wherein the microorganisms are selected to corrode at least a corrodible portion of the material layer when heat and/or sweat is applied by the wearer during the intended use of the garment, and
   wherein, before a first use of the garment, the corrodible portion of the material layer is configured to extend across two or more of the single chambers.

2. The garment according to claim 1, wherein the plurality of receiving spaces are formed as a uniform pattern along a surface of the material layer.

3. The garment according to claim 1, wherein the wall structure has a rectangular, a round, or a hexagonal shape when viewed perpendicular to a surface of the material layer.

4. The garment according to claim 1, wherein the microorganisms are bacteria of the kind ideonella sakaiensis and the material layer comprises polyethylene terephthalate.

5. The garment according to claim 1, wherein the microorganisms are bacteria of the kind actinobacteria.

6. The garment according to claim 1, wherein the microorganisms are bacteria of the kind proteobacteria.

7. The garment according to claim 1, wherein the microorganisms are bacteria of the kind bacteroidetes.

8. The garment according to claim 1, wherein the microorganisms are bacteria of the kind pseudomonas putida and the material layer comprises polyurethane.

9. The garment according to claim 1, wherein the gelatinous media is a gelatinous gel.

10. The garment according to claim 1, wherein the garment is a sports shoe.

11. The garment according to claim 1, wherein the garment is a sports suit, a sports jacket, a sports trousers, a sports shirt, or accessories which have contact to a body of the wearer during intended use.

12. The garment of claim 1, wherein the material layer is an outermost layer of the garment.

13. The garment of claim 1, wherein the microorganisms create one or more apertures in the material layer.

14. The garment of claim 1, wherein the receiving spaces are enclosed cavities.

15. The garment of claim 10, wherein the region is an upper of the shoe.

16. A garment, the garment comprising:
   an inner layer; and
   an outer layer covering the inner layer;
   wherein the outer layer comprises at least one material comprising polyethylene terephthalate and/or polyurethane,
   wherein the inner layer includes a plurality of receiving spaces arranged at an inner side of the outer layer and formed by a plurality of single chambers in which microorganisms are placed,
   wherein the single chambers are separated from one another by a wall structure arranged along the inner side of the outer layer,
   wherein the wall structures contact the inner side of the outer layer,
   wherein the single chambers are closed by a cover which is in contact with a wearer during intended use,
   wherein in addition to the microorganisms a gelatinous media is arranged in the plurality of receiving spaces,
   wherein the microorganisms are selected to corrode at least a corrodible portion of the outer layer when heat and/or sweat is applied by the wearer during the intended use of the garment, and
   wherein, before a first use of the garment, the corrodible portion of the outer layer is configured to extend across two or more of the single chambers.

17. The garment of claim 16, wherein one or more of the single chambers are closed by the cover on a first side, and the outer layer is arranged on a second side of the wall structure, opposite the first side.

18. The garment of claim 16, wherein the garment is a sports shoe.

19. The garment of claim 16, wherein the wall structure extends from the cover.

20. The garment of claim 16, wherein apertures formed by the corrosion expose the inner layer.

* * * * *